United States Patent
Sokol

[19]
[11] Patent Number: 5,961,646
[45] Date of Patent: Oct. 5, 1999

[54] METHOD AND APPARATUS EMPLOYING AN INVALID SYMBOL SECURITY JAM FOR COMMUNICATIONS NETWORK SECURITY

[75] Inventor: Michael A. Sokol, Rancho Cordova, Calif.

[73] Assignee: Level One Communications, Inc., Sacramento, Calif.

[21] Appl. No.: 08/770,949

[22] Filed: Jan. 2, 1997

[51] Int. Cl.[6] .................................................. G06F 13/00
[52] U.S. Cl. ................................ 713/201; 380/6; 380/25
[58] Field of Search ...................... 395/187.01, 200.59; 380/48, 6, 23, 25, 9; 370/13.1

[56] References Cited

U.S. PATENT DOCUMENTS

| | | | |
|---|---|---|---|
| 4,901,348 | 2/1990 | Nichols et al. | 380/6 |
| 4,998,247 | 3/1991 | Irvine-Halliday et al. | 370/94.1 |
| 5,161,192 | 11/1992 | Carter et al. | 380/48 |
| 5,177,788 | 1/1993 | Schanning et al. | 380/23 |
| 5,251,203 | 10/1993 | Thompson | 370/13.1 |
| 5,386,470 | 1/1995 | Carter et al. | 380/48 |

Primary Examiner—Robert W. Beausoliel, Jr.
Assistant Examiner—Pierre Eddy Elisea
Attorney, Agent, or Firm—Merchant & Gould P.C.

[57] ABSTRACT

A security device for use in communications network devices, such as multi-port repeaters, in local area networks to prevent eavesdropping by overwriting the data with an invalid symbol in the data communication packets transmitted to all unintended transceivers connected to the communications network device. Confidential or user sensitive information is not conveyed to the unintended transceivers since the invalid symbol is defined independent of the data. The invalid symbol unambiguously informs the unintended transceivers that the data in the data packet is invalid.

17 Claims, 7 Drawing Sheets

METHOD AND APPARATUS EMPLOYING AN INVALID SYMBOL SECURITY JAM FOR COMMUNICATIONS NETWORK SECURITY

BACKGROUND OF THE INVENTION

1. Field of the Invention.

This invention relates in general to a security management device, and in particular, to a method and apparatus for preventing eavesdropping using an invalid symbol to jam data communications to unintended network devices in a communications network.

2. Description of Related Art.

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. As the popularity of networks increase so does the demand for performance. More sophisticated protocols are being established to meet this demand and are utilizing existing twisted pair wires in office buildings so that virtually all computer literate users have access to resources with minimal expense.

A multi-port repeater is a communications network device which is commonly used to provide network access to end user stations such as personal computers, work stations and so on. This device has multiple "ports". In many cases, each port is connected to one end node using the 10BASE-T "Twisted Pair" or 100BASE-X connection defined by the IEEE 802.3 Standard. The ports serve as physical interfaces between the communications network device and the end user stations. Each port is operated according to the IEEE 802.3 Repeater Specification. When a data communications packet (packet) is received from any single port, it is repeated to all other ports in accordance with the standard. When more than one packet is received at any time, the multi-port repeater performs the collision algorithm as defined in the standard.

An Ethernet bridge is a device with two or more physical ports that is capable of forwarding a packet received on any port to any other single port based on the destination address of the packet. A packet that is not forwarded to a port is considered filtered.

A Media Access Control (MAC) function converts digital information, typically stored in memory in the form of a packet, into an actual Ethernet frame which can be transmitted on an Ethernet connection, or a frame received from the network connection which is stored in memory as a packet.

One of the key issues involving network security is the problem of eavesdropping. Eavesdropping occurs because a packet received on one port of a repeater is repeated to all ports on the repeater. Thus, absent some security mechanism, network devices connected to ports other than the one associated with the destination address in the data packet will also receive the packet. Ethernet bridges do not have this problem because they have the capability of forwarding a packet to the intended port, i.e., the port connected to an end user station having a source address matching the destination address in the packet, without repeating the packet to devices resident on the other ports by utilizing the source and destination information contained within the packet.

A need exists for improved security mechanisms to prevent eavesdropping on LAN or WAN networks employing multi-port repeaters without the expense or signal delay associated with the use of bridges. In typical network operations using "multi-port repeaters," each port of the multi-port repeater is permanently dedicated to a single user. To the network, this user is uniquely identified by the Ethernet address associated with the user's end-node device (such as personal computers, workstation, etc.). Every time the user sends out a packet onto the network, the end node automatically transmits its unique Ethernet address in the "Source Address Field" defined by the IEEE 802.3 Standard as part of the packet. The packet also includes a "Destination Address Field" to identify the source that is intended to receive the packet.

One scenario which network security schemes encounter is network devices intercepting sensitive or confidential data not intended for them. One means of dealing with this problem is to suspend the transmission of the data to the unintended network devices. However, a major drawback with this solution is the possibility of unacceptable collisions occurring when those network devices attempt to transmit not realizing that there is existing network traffic. This solution also violates the IEEE 802.3 repeater standard.

One means of preventing eavesdropping is disclosed in U.S. Pat. Nos. 5,161,192 and 4,901,348, issued to Carter et al. and Nichols et al., respectively. Using this method, eavesdropping is prevented by substituting an independent or random bit pattern in place of the data transmitted to unintended network devices. These security systems rely on the fact that the substitution of an independent bit pattern will result in a data frame not being a legal data frame according to the IEEE 802.3 Standard or the LAN protocol. More specifically, the IEEE 802.3 Standard defines a media access control (MAC) frame structure which includes a method for checking the validity of the transmitted data. A cyclic redundancy check (CRC) value is calculated using a predefined algorithm applied to the data packet contents, excluding the start frame delimiter (SFD) and frame check sequence (FCS) fields. The transmitting device inserts the calculated CRC value in the FCS field for outgoing data packets. The receiving device calculates the CRC value based on the data packets and compares the value with the value in the FCS field of the transmitted packet. If the values are not identical, an error results which indicates the data packet is invalid. Although this method identifies an illegal data frame a high percentage of the time, there remains a possibility that the independent bit pattern will be similar enough to the data replaced that no error will be generated. In such a case, the unintended network device has no indication that it was not the intended destination and that the data is invalid. This can result in unnecessary and undesired negative consequences. Erroneously using the independent or random bit pattern as legitimate data may lead a user or a network device to take inappropriate and potentially damaging actions based on those results.

As the above demonstrates, a need exists for improved security mechanisms to prevent eavesdropping on LAN or WAN networks employing multi-port repeaters wherein a data packet sent to an unintended network device is jammed in a way that unambiguously indicates to the receiving network device that the data contained in the data packet is invalid.

SUMMARY OF THE INVENTION

To overcome the limitations in the prior art described above, and to overcome other limitations that will become apparent upon reading and understanding the present specification, the present invention discloses a security jamming device employing a HALT symbol to prevent eavesdropping in a communications network having a communications network device such as a repeater. The security jamming device protects against transmitting sensitive or confidential data to unintended network devices on a communications network. Moreover, the HALT symbol, as defined by IEEE 802.3u Standard published by The Institute of Electrical and Electronics Engineers, Inc. and herein incorporated by reference, designates that the data in the data packet (or protocol data unit, PDU) is invalid. Thus, the unintended end user station will not erroneously mistake the HALT symbol for valid data.

The security management device stores network device source addresses for network devices connected to the communications network. Upon receiving a packet, the security management device compares the destination address contained within the packet against the stored source addresses. Those network devices with source addresses not matching the destination address receive the packet forwarded in a modified form, i.e., the HALT symbol is substituted for the data in the packet. Those network devices with source addresses matching the destination address receive the packet forwarded in a non-modified form.

The presence of the HALT symbol in the packet ensures unintended network devices know the data is invalid. There is no ambiguity with regard to the validity or invalidity of the data. Furthermore, since the HALT symbol represents a value independent of the data contained within the packet, no information about the original data is transmitted to unintended network devices on the communications network.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and changes may be made without departing from the scope of the present invention.

The present invention provides a security jamming device employing an invalid symbol to prevent eavesdropping for use in a communications network device in a communications network. The communications network device includes a receiving unit for receiving protocol data units (PDUs) or packets in through at least one port connected to the communications network and a sending unit, operatively coupled to the receiving unit, for sending protocol data units out through at least one port connected to the communications network. Further, the communications network device may also perform one or more communications networking functions including: switching, routing, bridging, and repeating. The particular details of the receiving and sending units are described in reference to FIGS. 1–5 in the following discussion.

Figure 1A:
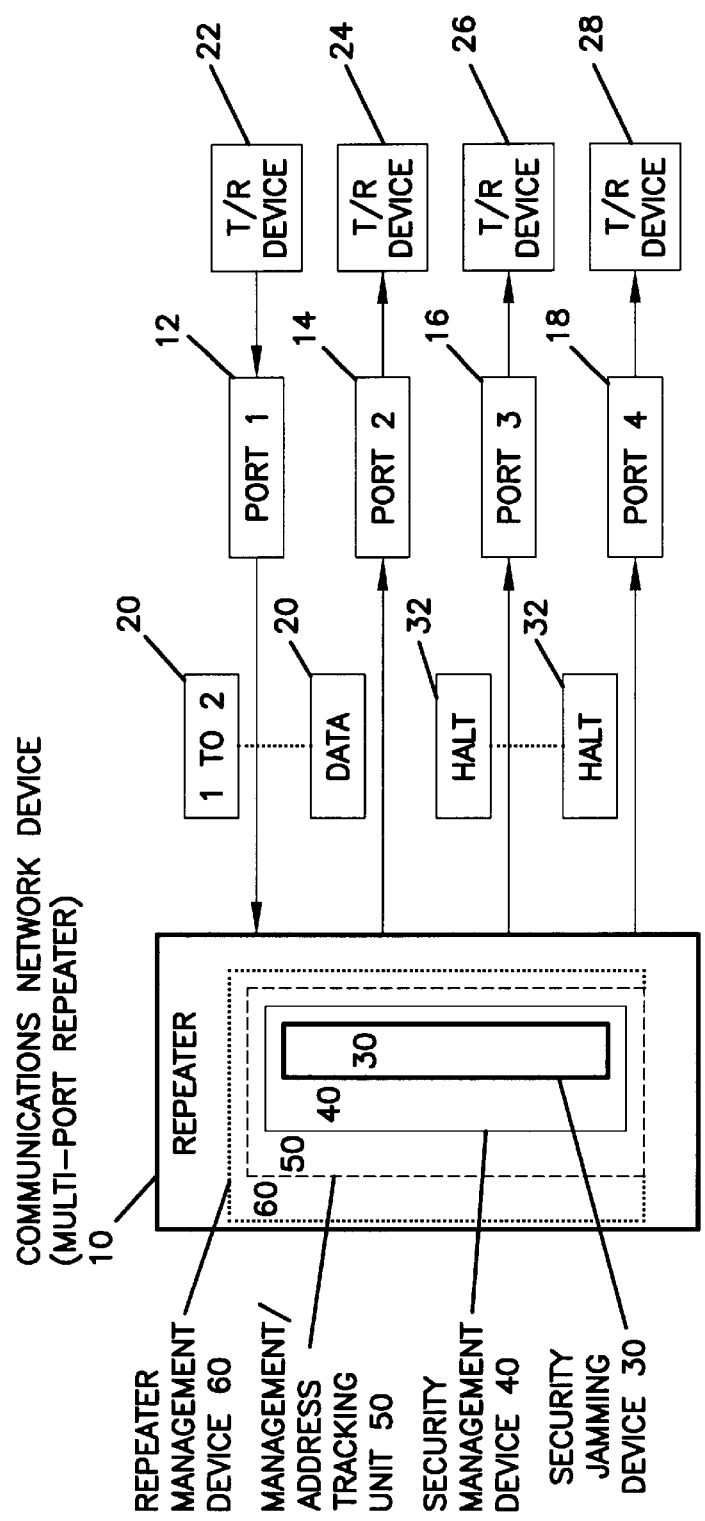
FIG. 1A is a system diagram illustrating the operation of the present invention.

FIG. 1A is a system diagram illustrating the operation of the present invention. A communications network device 10 is operatively coupled to one or more transmitting and receiving (transceiver) units 22, 24, 26, and 28. Messages or data 44 contained in a data communications packet 20 or PDU are transmitted from the transceiver 22 to the communications network device 10. Some of these messages 44 are transceiver specific, i.e., they are not intended to be delivered to all transceivers on the communications network device 10. For purposes of illustration, FIG. 1A shows a situation where a message 44 from transceiver 22 is intended for transceiver 24, but is not intended for transceivers 26 and 28. In accordance with the present invention, a communications network device 10, which comprises a repeater management device 60, a management address tracking unit 50, a security management device 40 and a security jamming device 30, allows the original packet 20 to pass unaltered (a non-modified PDU) to the intended transceiver 24. However, prior to transmitting to the unintended devices 26 and 28, the communications network device 10 replaces the message 44 of the original non-modified PDU 20 with a HALT symbol 48, thereby creating a modified PDU 32. This operation is further described below with reference to FIG. 1B.

Figure 1B:
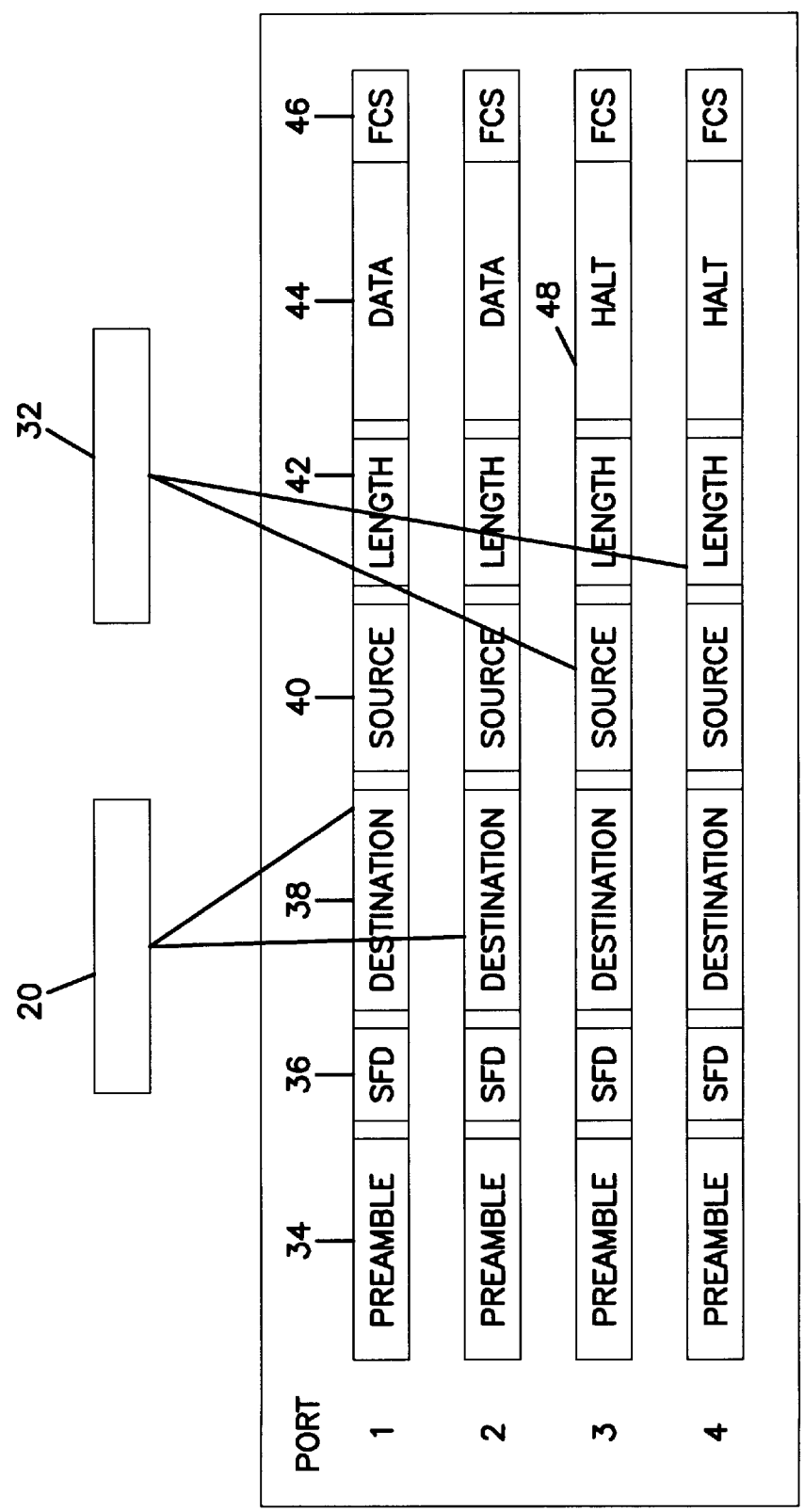
FIG. 1B is a diagram illustrating the data structure of a data packet in both modified and non-modified form of the present invention.

FIG. 1B presents a diagram showing the data structure of the PDU, in both modified 32 and non-modified 20 form. As shown, the PDU comprises a preamble field 34, a start frame delimiter (SFD) field 36, a destination address field 38, a source address field 40, a length field 42, a data field 44 (including a pad if necessary) and a frame check sequence (FCS) field 46 in accordance with the IEEE 802.3 Standard. After the communications network device 10 receives the PDU 20 from the transceiver 22, the communications network device 10 compares the destination address 38 against known sources derived from the source address field 40 of all previously tracked sources. The known sources are contained in the source address register 54 and are further described herein with reference to FIG. 2. Non-modified PDUs 20 are forwarded from the communications network device 10 to the transceivers 24, 26 and 28, based on whether the source address of the transceivers 24, 26, and 28 matches the destination address 38 of the PDU 20. Those transceivers 26 and 28 with source addresses not matching the destination address 38 of the PDU 20 receive a modified PDU 32 wherein the HALT symbol 48 is inserted in place of the data 44 in the data field. The HALT symbol 48 could also be inserted into other portions of the PDU 20 without departing from the scope of the present invention. For example, the HALT symbol 48 may be placed in the source address field 40 or the length field 42.

In one embodiment of the invention, all intended transceivers 24 are allowed to receive the non-modified PDU 20 with the data 44 fully intact while unintended transceivers 26 and 28 would receive a modified PDU 32 with the HALT symbol 48 substituted for the data 44. The HALT symbol 48 unambiguously indicates to the transceivers 26 and 28 that the modified PDU 32 contains invalid data.

The above teaching can be used to optimize receiving unit 24, 26, and 28, sending unit 22, and/or communications network device 10 to manipulate many different types of protocol data units 20, including packets, frames, and cells, so long as the relevant protocols define a HALT or other similar signal. Also, the receiving units 24, 26 and 28, sending unit 22, and communications network device 10 may be optimized to operate in an IEEE 802-based communications network, such as a twisted pair-based communications network.

One embodiment of the present invention provides a Secure Operations Mode which permits selectively enabling eavesdropping security on a port-by-port basis. The destination address 38 of an incoming PDU 20 is compared to the tracked source addresses corresponding to selected enabled ports. Any selected enabled port with a source address which does not match the destination address 38 receives a HALT symbol 48 instead of the original data 44 contained within the PDU 20. Ports that do not have this function enabled continue to receive the PDU 20 in a non-modified format regardless of whether the destination address 38 matches any of the known source addresses.

Figure 2:
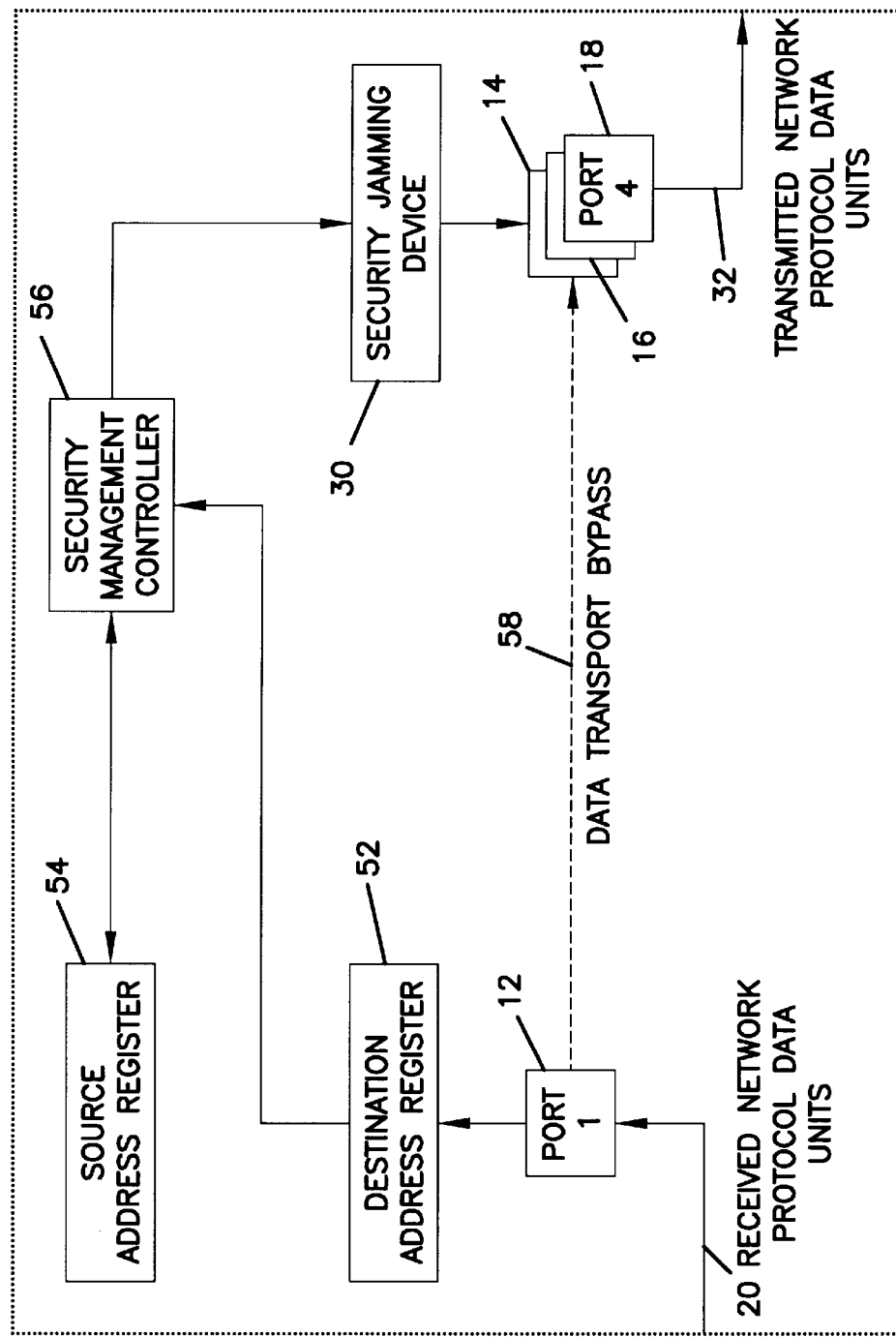
FIG. 2 is a functional block diagram of the security management device of the present invention.

FIG. 2 is a functional block diagram of a security management device 40 in accordance with the present invention. The security management device 40 may be implemented in a combination of hardware and/or software in the management and address tracking unit 50. The security management device 40 determines which PDUs 20 are sent out to the transceivers 24 in a non-modified format 20 and those transceivers 26 and 28 that receive the modified PDU 32.

The security management device 40 includes a controller 56 operatively coupled to a source address register 54 and a destination address register 52. The destination address register 52 holds the destination address 38 for a PDU 20 received by the communications network device 10 and the source address register 54 holds at least one source address. Each source address in the source address register 54 corresponds to a known network device, i.e., any transceiver connected to the communications network device 10.

The security management device 40 includes a security jamming device 30 oppressively coupled to the controller 56. The security jamming devices 30 jams data communications 20 to transceivers 26 and 28 with source addresses in the source address register 54 not matching the destination address 38 in the data communications 20. The security jamming device 30 jams data communications 20 by writing a HALT symbol 48 to the data field 44, length field 42, or source address field 40 of the data communications 20 creating a modified PDU 32. The HALT symbol 48, as defined by the IEEE 802.3u standard, unambiguously indicates to the receiving transceivers 26 and 28 that the modified PDU 32 is not valid.

In one embodiment, the controller 56 includes a mechanism for operating in a free-run or unlocked mode. In the unlocked mode the destination address 38 from the destination address register 52 is placed into the source address register 54 prior to comparing the source addresses in the source address register 54 and the destination address 38 in the destination address register 52. Thus, a comparison will always result in a match so that all transceivers connected to the communications network device 10 will receive the non-modified PDU 20.

In another embodiment, the controller 56 also includes a mechanism for operating in a lock mode. In the lock mode, the known sources contained within the source address register 54 are not updated to include the destination address 38 stored in the destination address register 52. The security management device 40 functions in the manner previously described in regard to FIG. 2.

Table I illustrates the actions taken by the controller 56 depending on the lock mode, and whether the destination address 38 of the incoming PDU stored in the destination address register 52 matches a source address stored in the source address register 54.

It can be seen from Table I that when the source address register 54 is "unlocked", the controller 56 updates the source addresses in the source address register 54 when a previously unknown source address is encountered. However, when the source address register 54 is "locked", it provides a valuable security mechanism that prevents eavesdropping or intercepting of confidential information by unintended network devices by jamming the data packet transmitted to unrecognized network devices.

In one embodiment, the PDU 20 is passed from port 12 to ports 14, 16, and 18 on a data transport bypass 58 that avoids the controller 56, so that the transport of the PDU 20 in the communications network device 10 is handled by a combination of hardware and software other than the controller 56. The data transport bypass 58 is operatively coupled to the receiving 12 and transmitting ports 14, 16 and 18 on the communications network device 10 whereby the transport of the data packets 20 circumvents the controller 56.

This arrangement allows the controller 56 to focus on control operations, which speeds up processing of the PDUs 20. However, the controller 56 prevents the PDUs 20 received through port 12 from being transmitted in a non-modified format through ports 16 and 18 when a comparison between the destination address register 52 and the source addresses corresponding to ports 16 and 18 stored in the source address register 54 results in no match. On the other hand, the controller 56 allows the PDU 20 to be transmitted intact out through port 14 when a comparison results in a match between the destination address register 52 and the source address register 54, after being received in through port 12.

Figure 3:
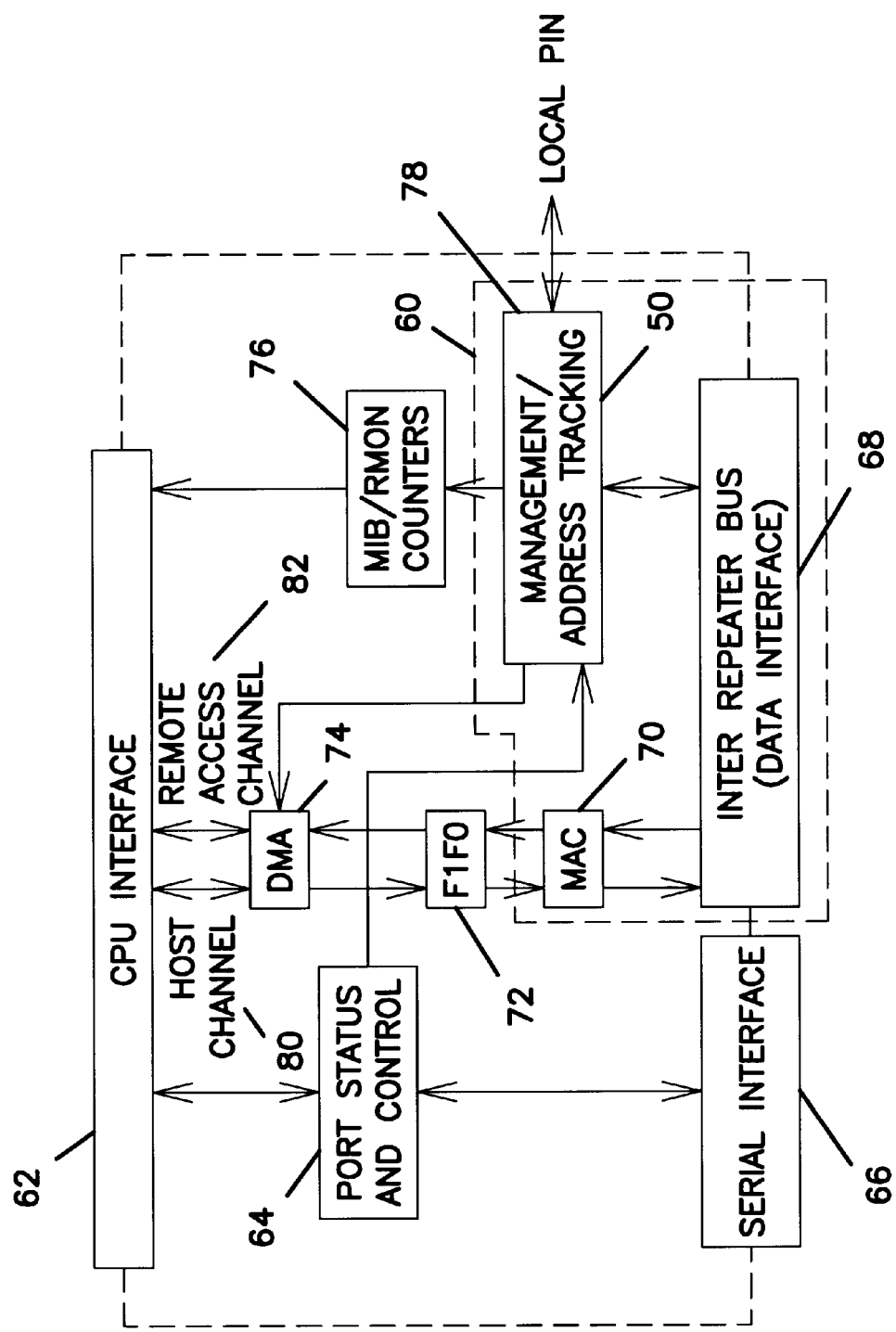
FIG. 3 is a system block diagram showing the repeater management device of the present invention.

FIG. 3 is a system block diagram showing the repeater management control system or repeater management device (RMD) 60 and its associated interfaces. The RMD 60 includes the management and address tracking unit 50 which implements the security management device 40 through a combination of hardware and/or software. The transfer of information to the management and address tracking unit 50 is controlled using security monitoring defined in the management and address tracking unit 50. A local pin 78 provides a communication channel from the management and address tracking unit 50 to other RMDs. The RMD 60 uses a serial interface 66 connecting with the repeaters to route information pertaining to port status and control 64. This information may then be relayed to the management and address tracking unit 50. The management and address tracking unit 50 as well as the media access controller (MAC) 70, direct memory access (DMA) 74, and first-in first-out memory (FIFOs) 72 snoop the inter-repeater bus 84. The Management Information Base (MIB) and Repeater Monitor (RMON) counters 76 are provided for each port for tracking repeater port status. The port status and control 64, DMA 74 and the MIB and RMON counters 76 have access to the CPU interface 62. A host channel 80 and a remote access channel 82 are provided between the CPU interface 62 and the DMA 74.

Figure 4:
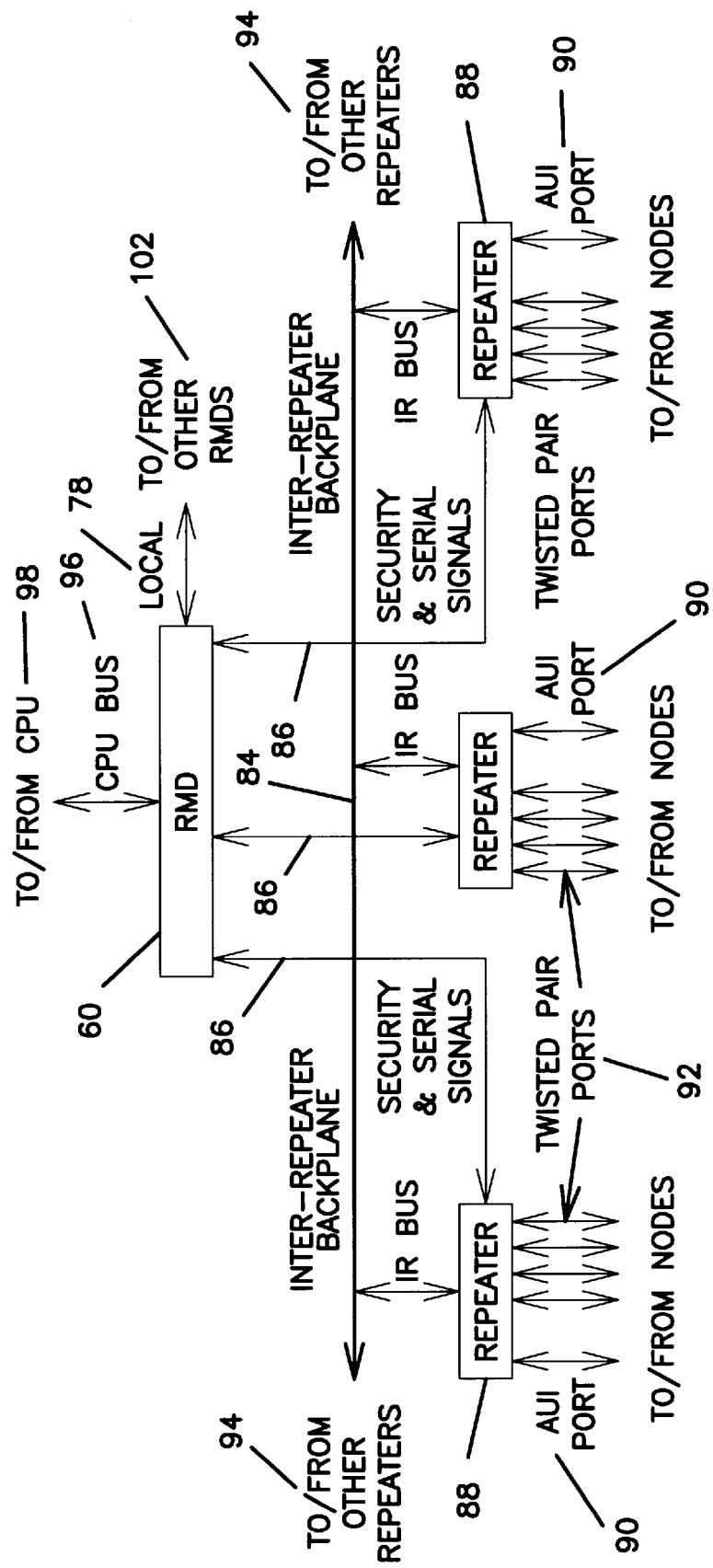
FIG. 4 is a block diagram of a repeater/repeater management device in accordance with the present invention.

FIG. 4 illustrates one embodiment of the repeater management device (RMD) 60. An inter-repeater bus 84 routes information to and from remote repeaters 94. Security and Serial signals 86 are routed to repeaters 88 connected to the RMD 60. The repeaters 88 provide AUI ports 90 and twisted pair ports 92. A CPU bus 96 connects the RMD 60 to a CPU 98. A local pin 78 is used to transfer information to and from other RMDs 102.

Figure 5A:
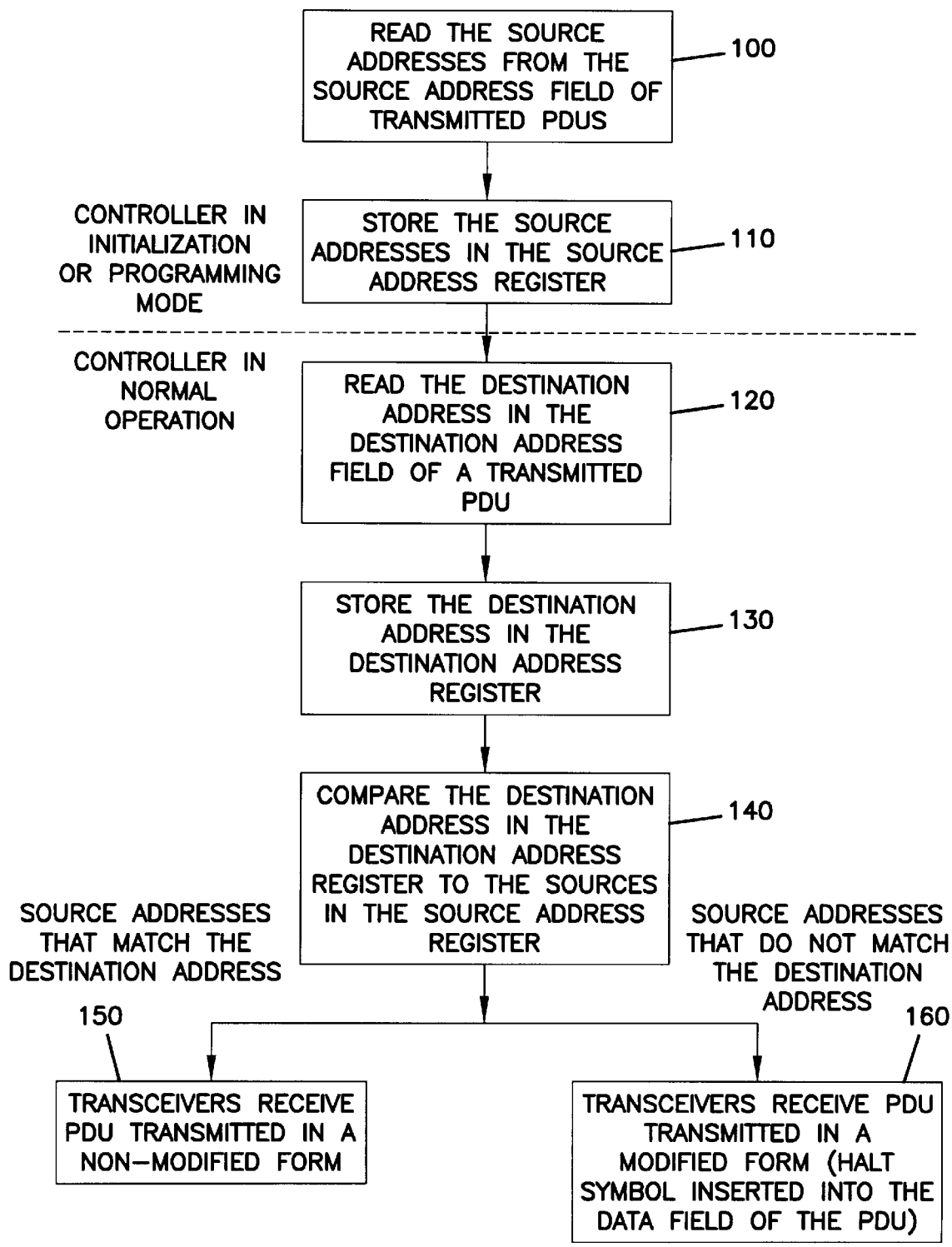
FIG. 5A is a block diagram illustrating the sequence of steps required to perform eavesdropping security wherein the source address register is updated using "tracked" source addresses in accordance with this invention.

FIG. 5A is a flowchart illustrating the general flow performed for eavesdropping security according to the present invention. At blocks 100 and 110 the source address register 54 is updated by reading the source addresses from transmitted PDUs 20 when the controller 56 is an initialization or programming mode. At block 100 the controller 56 reads the source addresses from the source address field 40 of transmitted PDUs 20. At block 110 the controller 56 stores the source addresses in the source address register 54. At block 120 the controller 56 reads the destination address from the destination address field 38 of the PDU 20 received from a communication port 12 coupled to the communications network. The controller 56 stores the destination address 38 in the destination address register 52 at block 130. At block 140, the controller 56 compares the destination address 38 in the destination address register 52 to the source addresses stored in the source address register 54. The outcome of the comparison of block 140 determines the next step. Those transceivers 24 with source addresses stored in the source address register 54 that match the destination address 38 stored in the destination address register 52 receive the packet in a non-modified form 20 at block 150. Transceivers 26 and 28 with source addresses stored in the source address register 54 that do not match the destination address 38 stored in the destination address register 52 receive a PDU modified 32 wherein a HALT symbol 48 is substituted in place of the data 44 at block 160.

Figure 5B:
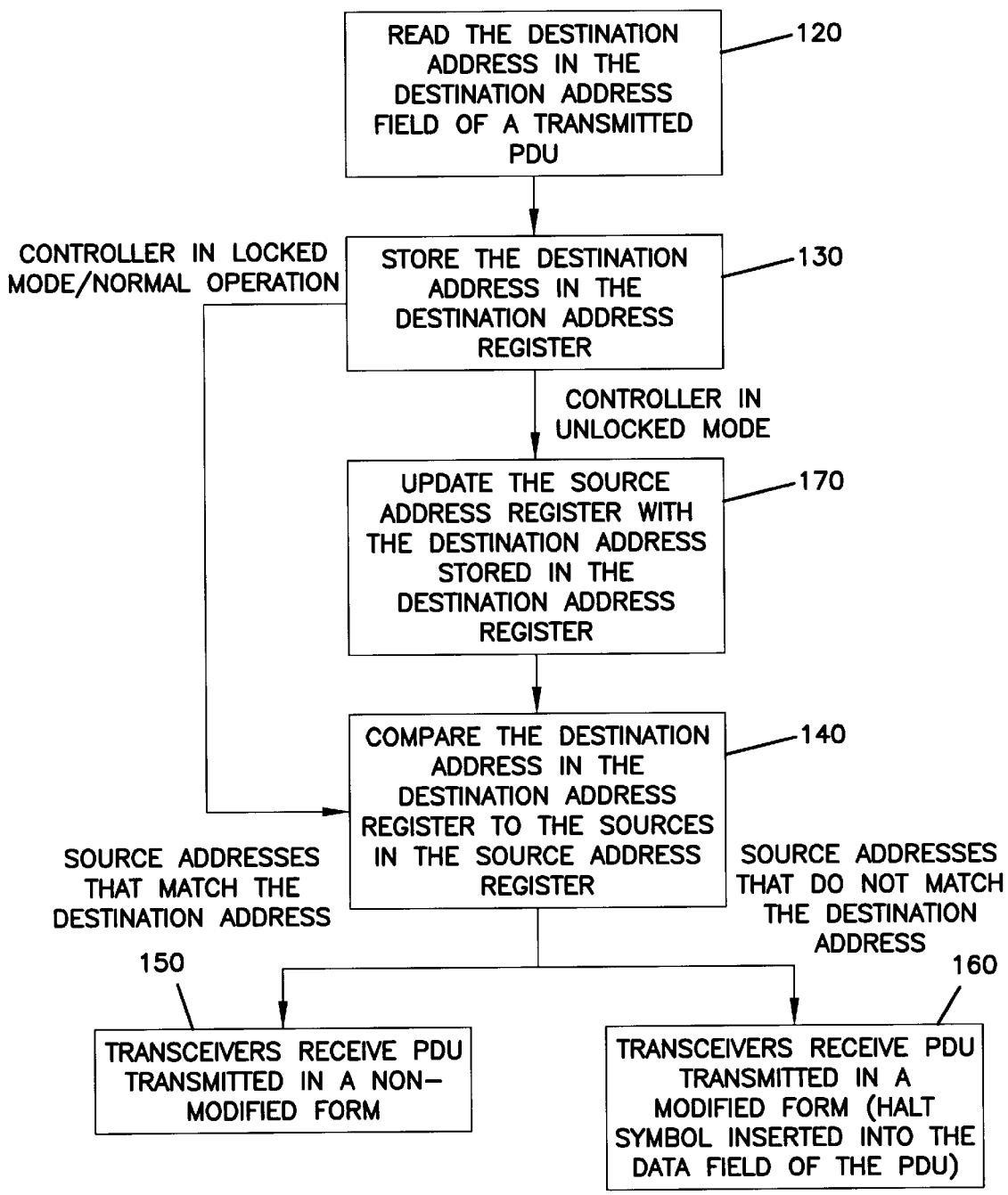
FIG. 5B is a block diagram illustrating the sequence of steps required to perform eavesdropping security wherein the source address register is updated by the destination address register with the controller in an unlocked mode in accordance with this invention.

Alternatively, another method is illustrated in FIG. 5B for performing eavesdropping security wherein the source address register 54 is updated by the destination address register 52 when the controller 56 is in an unlocked or free-run mode. At block 120 the controller 56 reads the destination address 38 from the transmitted PDU 20. The controller 56 stores the destination address 38 in the destination address register 52 at block 130. When the controller 56 is in an unlocked mode the controller 56 updates the source address register 54 with the destination address 38 stored in the destination address register 52 at block 170. Then, at block 140, the controller 56 compares destination address 38 in the destination address register 52 to the source addresses in the source address register 54. The comparison will necessarily result in a match since the source address register 54 was updated by the destination address register 52 prior to the comparison. Thus, at block 150, the controller 56 will then transmit the PDU in a non-modified form 20.

However, when the controller 56 is in a locked mode the source address register 54 is not updated by the destination address register 52 prior to a comparison. This results in skipping block 170 so that the step after storing the destination address 38 in the destination address register 52 in block 130 is comparing the destination address 38 in the destination address register 52 to the source addresses in the source address register 54 at block 140. The outcome of the comparison of block 140 determines the next step. Those transceivers 24 with source addresses stored in the source address register 54 that match the destination address 38 stored in the destination address register 52 receive the packet in a non-modified form 20 at block 150. Transceivers 26 and 28 with source addresses stored in the source address register 54 that do not match the destination address 38 stored in the destination address register 52 receive a PDU modified 32 wherein a HALT symbol 48 is substituted in place of the data 44 at block 160.

CONCLUSION

This concludes the description of the preferred embodiment of the invention. The following paragraphs describe some alternative methods of accomplishing the same objects.

The application cited in the present specification is for illustrative purposes only and is not intended to be exhaustive or to limit the invention to the precise form disclosed. For example, the present invention is applicable to any I/O device adapter that has a memory and is not limited to network adapters.

The present invention is applicable to systems with different configurations of devices and components. For example, the security management functions were described with reference to a 100 Mbit/s Ethernet repeater. However, it will be appreciated by those skilled in the art that these security management functions can readily be implemented in conjunction with other communications networking devices that perform switching, routing, and/or bridging so long as the systems implementing these functions use protocols defining a halt symbol or any other symbol that unambiguously informs the recipient that the data with the packet is not valid. These other communications networking tasks may or may not be in conjunction with the repeating tasks described herein.

The present invention is applicable to different methods for creating and storing the source addresses stored in the source address register. In addition to updating the source address register with the destination address register information when the security management controller is in an unlocked mode, the source address register may also be updated through entering source address information from a transceiver operatively coupled to the network communications device, i.e., entering "expected" or "known" source addresses. Alternatively, the source address register may be updated by reading source address information from data communications packets when the security management controller is in a initialization or programming mode, i.e., entering "tracked" source addresses.

The present invention can be also implemented with different types of memory including but not limited to Random-access memory (RAM), Direct-access storage, Sequential-access storage, Associative memory, and Read-only memory (ROM). Memory may also be defined in a number of forms including but not limited to registers, caches, queues, virtual memory and buffers.

The use of addresses in the present invention pertains individual addresses as well as group addresses such as multicast-group addresses and broadcast addresses. Also, it is recognized that the present invention may be used with a variety of media access control frame structures having a destination address field, a source address field, a data field, and a HALT or similar symbol.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

TABLE I

| Lock Mode | Match? | Action |
|---|---|---|
| Unlocked | Match | None - All receiving units receive non-modified PDUs 20. |
|  | No Match | Update source address register 54 and all receiving units receive non-modified PDUs 20. |
| Locked | Match | Matching receiving units receive non-modified PDUs 20. |
|  | No Match | All non-matching receiving units receive modified PDUs 32. |

What is claimed is:

1. A security management device for providing secure data communications between a plurality of transceivers, the transceivers being coupled to ports on a communications network device in a local area network, the data communications including one or more data packets having a source address, a destination address and a data field, the security management device being operatively coupled to the communications network device, the security management device comprising:
   (a) a source address memory for storing a source address for each of the transceivers connected to the communications network device;
   (b) a security management controller coupled to the source address memory for comparing the destination address to the source addresses stored in the source address memory; and
   (c) a security jamming device, coupled to the security management controller, for jamming the data communications to the transceivers having source addresses not matching the destination address in the data packet wherein the security jamming device stores an invalid symbol into the data field of the data communications, and the invalid symbol unambiguously indicates to a receiving transceiver that the data communications is invalid.

2. The security management device of claim 1 further comprising a data transport bypass coupled to receiving and transmitting ports on the communications network device for expediting transport of the data packets between the transceivers and the communications network device, wherein the transport of the data packets circumvents the security management controller.

3. The security management device of claim 2 further comprising a destination address memory coupled to the security management controller for storing the destination address, wherein the security management controller compares the destination address stored in the destination address memory with the source address stored in the source address memory.

4. The security management device of claim 1 wherein the invalid symbol is a HALT symbol as defined by the IEEE 802.3u Standard.

5. The security management device of claim 1 wherein the security management controller selectively enables each of the ports for eavesdropping security.

6. The security management device of claim 1 wherein the communications network is an IEEE 802-based communications network.

7. The security management device of claim 1 wherein the communications network is a twisted pair-based communications network.

8. The security management device of claim 3 wherein the security management controller comprises means for updating the source address memory by inserting the destination address in the destination address memory into the source address memory prior to comparing the destination address in the destination address memory to the source addresses in the source address memory wherein a comparison results in a match so that the data packet is repeated to all transceivers connected to the communications network device.

9. A communications network device for providing data communications between a plurality of transceivers in a local area network, the data communications including at least one data packet having a source address, a destination address and a data field, the communications network device comprising:
   (a) a security management device coupled to the communications network device for providing eavesdropping security, the security management device comprising:
      (i) a source address memory for storing a source address for each of the transceivers connected to the communications network device;
      (ii) a security management controller coupled to the source address memory for comparing the destination address in the data packet to the source addresses stored in the source address memory; and
      (iii) a security jamming device, coupled to the security management controller, for jamming the data communications to the transceivers having source addresses stored in the source address memory not matching the destination address in the data packet, wherein the security jamming device stores an invalid symbol into the data field of the data packet, and the invalid symbol unambiguously indicates to a receiving transceiver that the data packet is invalid;
   (b) transmitting and receiving ports, coupled to the communications network device, for interfacing to the transceivers for sending and receiving data communications; and
   (c) a data transport bypass coupled to the receiving and transmitting ports for expediting transport of the data packets between transceivers and the communications network device, wherein the transport of the data within the network communications device circumvents the security management controller.

10. The security management device of claim 9 further comprising a destination address memory coupled to the security management controller for storing the destination address, wherein the security management controller compares the destination address stored in the destination address memory with the source address stored in the source address memory.

11. The communications network device of claim 10 wherein the security management controller comprises means for updating the source address memory by inserting the destination address in the destination address memory into the source address memory prior to comparing the destination address in the destination address memory to the source addresses in the source address memory wherein a comparison results in a match so that the data packet is repeated to all transceivers connected to the communications network device.

12. The communications network device of claim 9 wherein the invalid symbol is a HALT symbol as defined by the IEEE 802.3u Standard.

13. The communications network device of claim 9 wherein the security management controller selectively enables each of the ports for eavesdropping security.

14. A method of preventing eavesdropping on a communications network comprising a plurality of transceivers coupled to a communications network device, the method comprising:

(a) reading a data packet transmitted from a transceiver, the data packet having a source address in a source address field, a destination address in a destination address field, and data in a data field;

(b) comparing the destination address with a source address memory, the source address memory having source addresses, the source address memory being operatively coupled to the communications network device; and (c) inserting an invalid symbol in the data field of the data packet transmitted to transceivers having source addresses in the source address memory not matching the destination address in the data packet.

15. The method of preventing eavesdropping of claim 14 further comprising the step of entering source addresses in the source address memory.

16. The method of preventing eavesdropping of claim 15 wherein the step of entering the source addresses in the source address memory includes reading the source addresses from the source address field in the data packets when the security management controller is in an initialization or programming mode and storing the source addresses in the source address memory.

17. The method of preventing eavesdropping of claim 15 wherein the step of entering the source addresses in the source address memory includes reading the destination addresses from the data packets when the security management controller is in an unlocked mode and storing the destination addresses in the source address memory as source addresses.

* * * * *